United States Patent
Moses

(10) Patent No.: US 7,975,347 B1
(45) Date of Patent: Jul. 12, 2011

(54) BATTERY OPERATED ICE SCRAPER

(76) Inventor: William J. Moses, Short Pump, VA (US)

( * ) Notice: Subject to any disclaimer, the term of this patent is extended or adjusted under 35 U.S.C. 154(b) by 813 days.

(21) Appl. No.: 12/070,502

(22) Filed: Feb. 20, 2008

(51) Int. Cl.
*A47L 13/02* (2006.01)

(52) U.S. Cl. ...................... 15/236.02; 15/93.1

(58) Field of Classification Search ............... 15/236.02, 15/236.01, 401, 402, 393, 236.1, 236.05, 15/250.05, 93.1, 380
See application file for complete search history.

(56) References Cited

U.S. PATENT DOCUMENTS

| | | | |
|---|---|---|---|
| 3,395,414 A | 8/1968 | Malin | |
| 3,642,002 A * | 2/1972 | Otterstrom | 606/177 |
| 3,935,425 A * | 1/1976 | Weissberger et al. | 219/228 |
| 4,182,000 A | 1/1980 | Fairbairn | |
| 4,286,383 A | 9/1981 | Farden | |
| 4,381,604 A | 5/1983 | Horst | |
| 4,559,661 A | 12/1985 | Tsals et al. | |
| 4,790,045 A * | 12/1988 | Doherty | 15/236.01 |
| 5,427,188 A * | 6/1995 | Fisher | 173/205 |
| 5,480,507 A * | 1/1996 | Arnold | 156/344 |
| 5,513,709 A | 5/1996 | Fisher | |
| 7,121,007 B2 * | 10/2006 | Ogston | 30/169 |
| 7,765,631 B2 * | 8/2010 | Fisher | 15/93.1 |

* cited by examiner

*Primary Examiner* — Dung Van Nguyen
(74) *Attorney, Agent, or Firm* — Norman B. Rainer

(57) ABSTRACT

A hand held battery operated device for removing ice from glass window surfaces includes hollow handle and barrel portions. A motor within the barrel portion drives an activation shaft to produce reciprocative movement of controlled rate and stroke length. A scraper component, releasibly attached to the activation shaft exteriorly of the barrel portion, terminates in a straight edge adapted to apply impact force to the ice/glass interface.

9 Claims, 2 Drawing Sheets

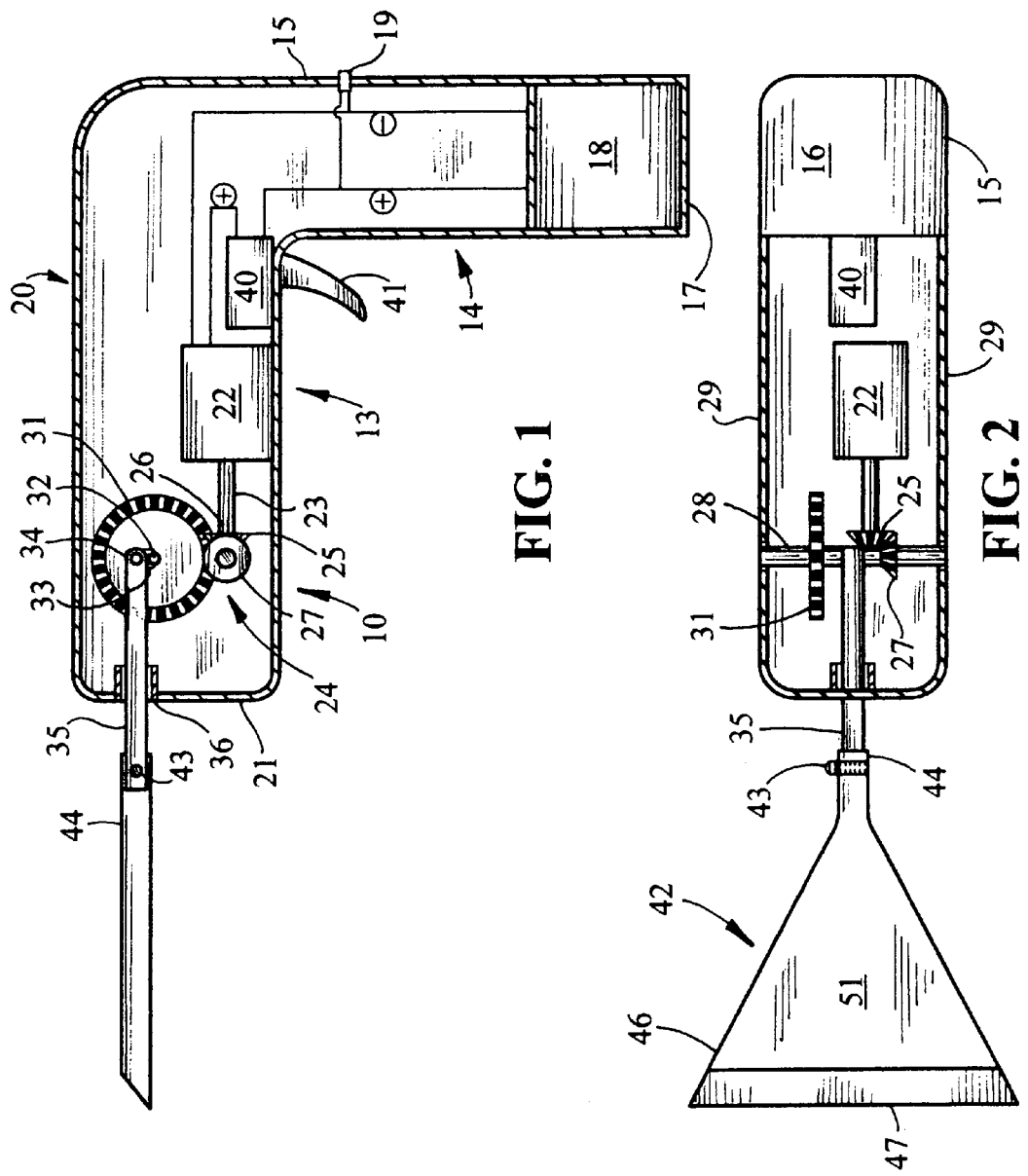

BATTERY OPERATED ICE SCRAPER

BACKGROUND OF THE INVENTION

1. Field of the Invention

This invention concerns a device for removing ice adhered to a vehicular windshield, and more particularly relates to such device which can be operated single-handedly.

2. Description of the Prior Art

Numerous scraper devices have earlier been disclosed. A typical prior scraper device is exemplified in U.S. Pat. No. 3,395,414 to Malin wherein a vibratory scraper head is attached to a conventional hand-held electrical drill which operates on 110 volt 60 cycle AC electrical current. The Malin scraper is intended for use on metal surfaces, and is sufficiently powered to accomplish its objective. However, the significant weight of the device and the long lever arm distance between the handle of the drill and the tip of the scraper head precludes single-handed operation by the person using the device. The Malin scraper further requires convenient access to a source of electrical current and an electrical cord extending between the scraper and source of electrical current.

U.S. Pat. No. 7,084,553 to Ludwiczak discloses apparatus which is attached to the edge of a vehicle windshield for imparting a vibration to the windshield to cause release of an ice coating. Such apparatus, which is costly to manufacture and install, has the potential of producing deterioration of the customary water tight seal between the windshield and body of the vehicle. It should also be noted that the Ludwiczak apparatus must apply sufficient force to overcome the ice/glass interfacial bonding energy across the entire windshield. This requires considerably more force than an ice removal mechanism which will focus force progressively only upon the leading lateral boundary of the ice/glass interface.

U.S. Pat. No. 5,179,754 to Stradnick describes a battery operated device for removing ice from a vehicular windshield. The device employs a circular rotating edge which is applied perpendicularly to the windshield. In such manner of operation, the rotating edge is caused to cut through the ice layer with the help of downward force applied by the operator. This requires considerable battery-derived and operator-derived energy, and necessitates repeated back and forth lateral movement of the rotating edge to produce a swath of cleared windshield.

It is accordingly an object of the present invention to produce a battery operated device for removing ice from a vehicle's windshield.

It is a further object of this invention to produce a device in accordance with the foregoing object which can be operated by a single hand of the user.

It is another object of the present invention to provide a device of the aforesaid nature which will perform efficiently with respect to requisite battery power and operator effort.

It is a still further object of this invention to provide a device of the aforesaid nature of high durability and amenable to low cost manufacture.

These objects and other objects and advantages of the invention will be apparent from the following description.

SUMMARY OF THE INVENTION

The above and other beneficial objects and advantages are accomplished in accordance with the present invention by a device for removing ice adhered to a vehicle's windshield comprising:

a) a hollow housing comprised of a handle portion having upper and lower extremities and a cross-sectional configuration amenable to easy gripping, an interiorly located battery which is re-chargeable by way of 12 volt D.C. current, and an electrical adapter jack interactive with said battery, b) a barrel portion emergent substantially orthogonally from the upper extremity of said handle portion and extending to a forward extremity and containing a motor energized by said battery and having a forwardly directed rotating drive shaft interactive with cam means that change the rotary motion of the drive shaft to reciprocative motion applied to an activation shaft that extends through said forward extremity and terminates in a front end, c) a continuously variable switch within said housing for controlling the amount of power delivered from said battery to said motor, said switch having a spring-biased trigger control arm extending outwardly from said housing adjacent the upper extremity of said handle portion, and d) a scraper component releasibly attachable to the front end of said activation shaft and having a forwardly directed blade terminating in a straight edge configured to contact said windshield in repetitive strokes, whereby e) said edge delivers adjustable impact force to the interface of said ice with said windshield, producing removal of said ice in wide, single pass paths with minimal stress to the hand of the user.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the ice scraper of the present invention with portions broken away to reveal internal details.

FIG. 2 is a top view of the embodiment of FIG. 1.

DESCRIPTION OF THE PREFERRED EMBODIMENT

Figure 3:
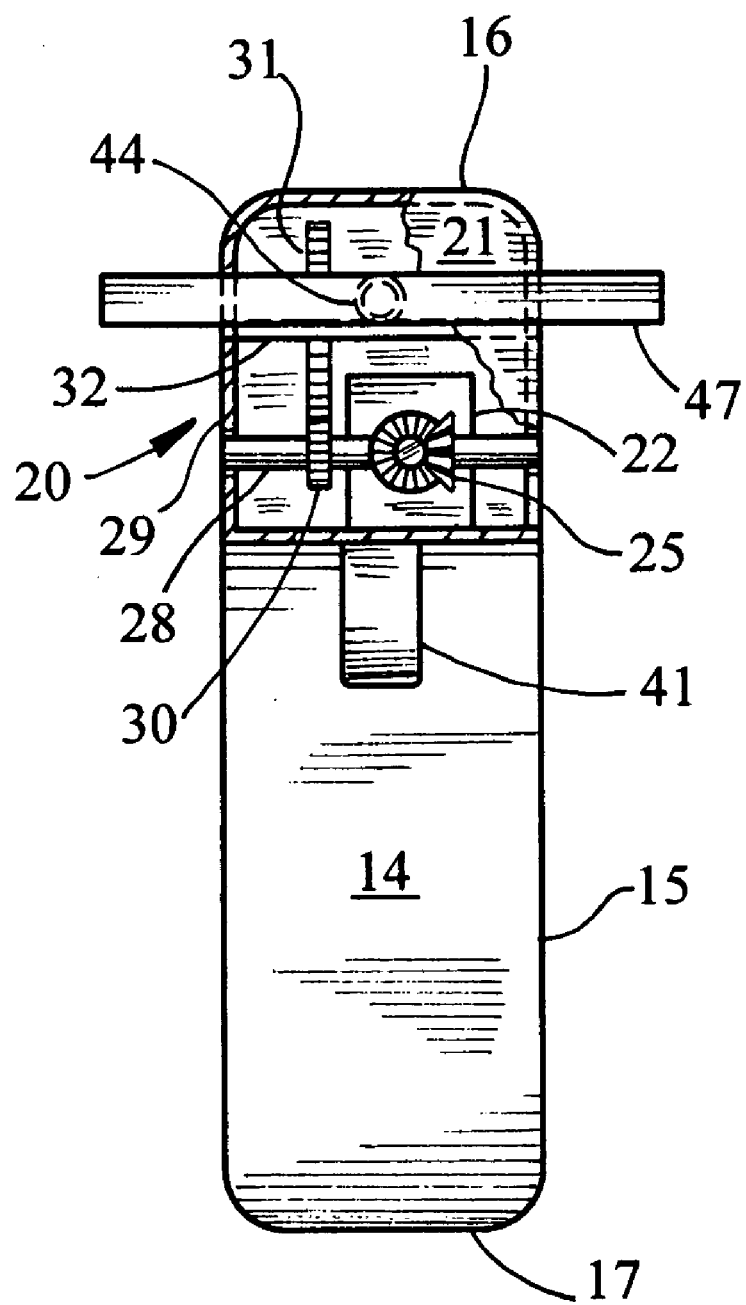
FIG. 3 is a front view of the embodiment of FIG. 1 with portions broken away to reveal internal details.

Referring now to FIGS. 1-3, an embodiment of the ice scraper 10 of the present invention is shown in operative association with a vehicle windshield 11 having a layer of ice 12.

Scraper 10 is comprised of a hollow housing 13 fabricated preferably of a high strength, lightweight plastic and having a handle portion 14 whose sidewall 15 is of rounded cross sectional configuration amenable to easy gripping, and extends between upper and lower extremities 16 and 17, respectively. A battery 18 which is re-chargeable by way of 12 volt D.C. current is confined within said handle portion. An adapter socket 19, electrically communicating with battery 18, is positioned in sidewall 15 and is designed to removably receive a plug which is connected to a conductor that extends to a conventional insert for the cigarette lighter of the vehicle.

A barrel portion 20 is emergent from upper extremity 16 of handle portion 14 as a continuous integral extension of said handle portion and in substantially orthogonal relationship therewith. Said barrel portion extends to a forward extremity 21, and confines a motor 22 energized by said battery. A forwardly directed rotating drive shaft 23 is emergent from motor 22. Drive shaft 23 is interactive with cam means 24 that convert the rotary motion of the drive shaft to reciprocative motion.

Said cam means includes a first bevel gear 25 fixedly mounted upon the distal end 26 of drive shaft 23, and a second bevel gear 27 interactive with said first bevel gear and secured upon first transverse axle 28 rotatively journaled to the interior of sidewall structure 29 of said barrel portion. Said first transverse axle secures a small spur gear 30 that interacts with a large spur gear 31 separately mounted upon a second transverse rotating axle 32. The effect of the interaction of the small and large spur gears is to cause the second transverse axle to have lower rotational speed (rpm) than said first transverse axle.

A control arm 33 is affixed to said second transverse axle, and extends to an apertured distal end 34. A straight activation shaft 35 is pivotably joined to said distal end 34, and extends through a sleeved aperture 36 in forward extremity 21 of said barrel portion. Rotative movement of gear 31 causes shaft 35 to undergo reciprocating linear motion while slideably guided by aperture 36. The stroke length of said reciprocative motion is determined by the length of control arm 33, and is preferably between ¼" and ½". The rate of said reciprocative motion is determined by the rotational speed of gear 31, and is preferably between 5 and 50 strokes/second. The rotational speed of gear 31 is controlled by trigger switch 40 which adjusts the flow of current from battery 18 to motor 22. Said switch 40 has a spring-biased trigger control arm 41 extending outwardly from said housing adjacent the upper extremity of said handle portion.

A scraper component 42 is releasibly associated with the front end of said activation shaft, preferably by way of a spring-urged ball and detent mechanism 43 which interacts with an upper tubular portion 44 of said scraper component. Said scraper component is preferably fabricated as a monolithic structure of hard plastic such as polycarbonate, and has a blade portion 51 that extends to a wide forward extremity 46 having a sharpened straight edge 47.

By virtue of the aforesaid critical features of construction, ice is removed from a windshield efficiently with minimal use of battery power in wide zones of clearance of the windshield and with minimal stress to the user's hand and arm.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A device for removing ice adhered to a vehicle's windshield comprising:
   a) a hollow housing comprised of a handle portion having upper and lower extremities and a cross-sectional configuration amenable to easy gripping, an interiorly located battery which is re-chargeable by way of 12 volt D.C. current, and an electrical adapter jack interactive with said battery,
   b) a barrel portion emergent substantially orthogonally from the upper extremity of said handle portion and extending to a forward extremity and containing a motor energized by said battery and having a forwardly directed rotating drive shaft interactive with cam means that change the rotary motion of the drive shaft to reciprocative motion applied to an activation shaft that extends through said forward extremity and terminates in a front end,
   c) a continuously variable switch within said housing for controlling the amount of power delivered from said battery to said motor, said switch having a spring-biased trigger control arm extending outwardly from said housing adjacent the upper extremity of said handle portion, and
   d) a scraper component releasibly attachable to the front end of said activation shaft and having a forwardly directed blade terminating in a straight edge configured to contact said windshield in repetitive strokes, whereby
   e) said edge delivers adjustable impact force to the interface of said ice with said windshield, producing removal of said ice in wide, single pass paths with minimal stress to the hand of the user.

2. The device of claim 1 wherein said barrel portion is bounded in part by opposed sidewall structure.

3. The device of claim 2 wherein said cam means includes a first bevel gear fixedly mounted upon said drive shaft and a second bevel gear interactive with said first bevel gear and secured upon a first transverse axle rotatively journaled to said sidewall structure.

4. The device of claim 3 wherein said first transverse axle secures a small spur gear that interacts with a large spur gear separately mounted upon a second transverse rotating axle, thereby causing said second transverse axle to rotate at a lower rpm than said first transverse axle.

5. The device of claim 4 wherein a control arm is affixed to said second transverse axle, and extends to a distal end.

6. The device of claim 5 wherein said activation shaft is pivotably joined to the distal end of said control arm and extends through an aperture in the forward extremity of said barrel portion, whereby rotative movement of said large spur gear produces reciprocating linear motion of said activation shaft.

7. The device of claim 1 wherein the stroke length of said reciprocative motion is between ¼" and ½".

8. The device of claim 7 wherein the rate of said reciprocative motion is between 5 and 50 strokes per second.

9. The device of claim 1 wherein said scraper component and blade are fabricated from hard plastic as a monolithic structure.

* * * * *